United States Patent
Kurian et al.

(10) Patent No.: US 11,108,685 B2
(45) Date of Patent: Aug. 31, 2021

(54) INTELLIGENT DELIVERY OF DATA PACKETS WITHIN A NETWORK TRANSMISSION PATH BASED ON TIME INTERVALS

(71) Applicant: BANK OF AMERICA CORPORATION, Charlotte, NC (US)

(72) Inventors: Manu Jacob Kurian, Dallas, TX (US); Jayachandra Varma, Irving, TX (US); Saritha Vrittamani, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 189 days.

(21) Appl. No.: 16/454,763

(22) Filed: Jun. 27, 2019

(65) Prior Publication Data
US 2020/0412643 A1    Dec. 31, 2020

(51) Int. Cl.
H04L 12/28     (2006.01)
H04L 12/725    (2013.01)
H04L 12/741    (2013.01)
H04L 12/721    (2013.01)
H04L 29/06     (2006.01)

(52) U.S. Cl.
CPC ............ *H04L 45/306* (2013.01); *H04L 45/38* (2013.01); *H04L 45/566* (2013.01); *H04L 45/74* (2013.01); *H04L 63/0428* (2013.01)

(58) Field of Classification Search
None
See application file for complete search history.

(56) References Cited

U.S. PATENT DOCUMENTS

| | | |
|---|---|---|
| 7,305,471 B2 | 12/2007 | Odhner et al. |
| 7,313,620 B2 | 12/2007 | Odhner et al. |
| 7,403,886 B2 | 7/2008 | Odhner et al. |
| 7,644,137 B2 | 1/2010 | Bozak et al. |
| 8,356,072 B1 | 1/2013 | Chakraborty et al. |
| 8,645,393 B1 | 2/2014 | Kolak et al. |
| 9,363,154 B2 | 6/2016 | Akolkar et al. |
| 9,411,622 B2 | 8/2016 | Zhu et al. |
| 9,413,619 B2 | 8/2016 | Akolkar et al. |
| 9,531,604 B2 | 12/2016 | Akolkar et al. |
| 9,667,498 B2 | 5/2017 | Wu et al. |
| 9,984,044 B2 | 5/2018 | Dunne et al. |
| 2012/0209971 A1* | 8/2012 | Howe ............... H04L 63/0428 709/223 |
| 2013/0235869 A1* | 9/2013 | Akiyoshi ............ H04L 45/54 370/389 |
| 2015/0347246 A1* | 12/2015 | Matsui ............... G06F 3/0653 714/4.12 |
| 2019/0182155 A1* | 6/2019 | Chang ................ H04L 61/251 |

* cited by examiner

*Primary Examiner* — Kwang B Yao
*Assistant Examiner* — Juvena W Loo
(74) *Attorney, Agent, or Firm* — Michael A. Springs; Moore & Van Allen PLLC; James C. Edwards

(57) ABSTRACT

Intelligent delivery/transmission of data within a secure transmission path of a distributed computing network. A plurality of logical switches are disposed throughout a secure transmission path between a source and target. A controller is configured to control a timing for delivery and/or routing of the data packets to the target apparatus by activating and deactivating the logical switches. In addition, activation of two or more switches provides for isolating data, such that, inline processing (e.g., security checks or the like) can be performed on the data.

19 Claims, 6 Drawing Sheets

INTELLIGENT DELIVERY OF DATA PACKETS WITHIN A NETWORK TRANSMISSION PATH BASED ON TIME INTERVALS

FIELD OF THE INVENTION

The present invention is generally network communication of data and, more specifically, intelligent delivery/transmission of data packets through activation and deactivation of logical switches disposed within a secure transmission path.

BACKGROUND

In many instances large data sets that require processing are transmitted from a data source to a target device or a cluster of target devices. However, in certain instances the target device or specific target devices within the cluster may not be available for processing the data set when the data set arrives or is otherwise scheduled to arrive. For example, the target device(s) may be currently processing other data, which may have a higher prioritization, than the data being transmitted. In such an example, the target device(s) may operate on a predefined schedule, in which, specified data types have predefined time intervals during a day, week or the like for processing the specified data types. In another example, the target devices may be experienced problems that prohibit the target device from currently processing data.

In other instances, it may be desired to perform security checks or other processes on data sets during the data transmission process. For example, if unauthorized access to the data set during the transmission is perceived to have occurred, it may be advantageous to perform inline security checks to insure that the transmission has not been tampered with. In addition, if the security checks result in a determination that the data set has been undergone unauthorized access, there may be a need to halt the transmission of the data set or re-route the data set to another destination.

Therefore, a need exists to address problems related to target device(s) being currently unavailable for data processing. Specifically, a need exists to resolve problems associated with target devices currently being unavailable based on prescribed time intervals for process data of specified data types, target device maintenance schedules, target devices being "down" or the like. In addition, a need exists to address problems associated the security of inline data transmissions, specifically a need exists to verify that data sets do not undergo unauthorized access during the transmission process and, if in fact the data set has been determined to have been tampered with during transmission, a need exists to take appropriate actions to insure that the target device does not receive or otherwise process the suspect data set.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for intelligent delivery/transmission of data sets within a secure transmission path of a distributed computing network. In this regard the present invention provides for a plurality of logical switches disposed throughout a secure transmission path between a source and target. A controller is configured to control a timing for delivery and/or routing of the data packets to the target apparatus by activating and deactivating the logical switches.

In specific embodiments of the invention, the current availability of the target device(s) to process data of a specified data types is determined on a per-target basis. Availability may be determined by accessing a target device schedule database or making a real-time call out to the target device(s). In response to determining that a target device(s) is currently not available for processing data of the specified data type, logical switch(es) may be activated to block transmission of the data and, in some embodiments of the invention, in response to determining that the target device (s) are currently available for processing the data, deactivate the logical switch(es) to allow transmission of the data to the target device(s). In other specific instances, in response to determining that the target device is unavailable for processing the data, the data is reroute away from an intended target device currently determined to be unavailable to a another target device currently determined to be available for processing the data. In such instances, a second secure transmission path may be created for transmitting the data packets to the second target device and/or the data packets may be re-tagged with a second destination address associated with the other target device.

In other embodiments of the invention, in response to determining an attempt to wrongfully access or intercept the data, the logical switch(es) are activated to block further transmission of the data packets, and/or (ii) the data is re-routed away from an intended target device(s) to a another target device(s).

In other embodiments of the invention, two or more switches in the transmission path are activated to isolate the data. The isolated data may then be subjected to security processes (antivirus checks) or the like. In specific embodiments of the invention, the activation of two or more switches to isolate the data may occur in one specific security zone or in each security zone, such that individual security processes may be performed within in security zone as the data is isolated.

A system for intelligent delivery of data packets within a secure transmission path defines first embodiments of the invention. The system includes a distributed communication network, at least one source apparatus in communication with the distributed communication network and configured for transmitting a data set comprising a plurality of data packets The system additionally includes at least one target apparatus comprising one or more target devices in communication with the distributed communication network and configured for receiving the data set via a secure transmission path established between the source apparatus and the target apparatus, and a plurality of network nodes disposed along the secure transmission path. The system additionally included a plurality of logical switches stored in a memory associated with at least one of the network nodes, executable by one or more processing devices associated with at least one of the network nodes. In addition, the system includes a controller stored in the memory associated with at least one of the network nodes, executable by one or more of the processing devices and configured to control at least one of (i) timing for delivery of the data packets to the target apparatus, and (ii) routing of the data packets by activating and deactivating the logical switches.

In specific embodiments of the system, the data packets are tagged with a destination address associated with one or more of the target devices and a data packet type. In such embodiments of the system, the controller may be further configured to scan the data packets along the secure transmission path to identify the destination address and the data packet type, and determine availability of the one or more target devices associated with the identified destination address for processing data of the identified data packet type. In such embodiments of the system, the controller may be further configured to, in response to determining that the one or more target devices are currently not available for processing data of the identified data packet type, activate one or more of the logical switches to block transmission of data packets of the identified data packet type, and, in response to determining that at least one of the one or more target devices are currently available for processing the data, deactivate the one or more of the logical switches to allow transmission of the data packets to the at least one of the one or more target devices.

In other specific embodiments the system includes a target device availability database configured to store information that indicates time intervals for processing data of a specified data packet type for each of the one or more target devices. In such embodiments of the invention, the controller is further configured to access the target device availability database to determine availability of one or more target devices based on the time intervals in the target device availability database associated with (i) the one or more target devices associated with the destination address, and (ii) the data packet type.

In other specific embodiments of the system, the controller is further configured to, in response to identifying the destination address and data packet type, receive information from the one or more target devices associated with the identified destination address that indicates a current availability of the one or more target devices to process data of the data packet type.

In still further specific embodiments of the system, the controller is further configured to, in response to determining availability of the one or more target devices associated with the identified destination address for processing data of the identified data packet type, reroute the data packets away from a first target device currently determined to be not available to a second target device currently determined to be available. In related embodiments of the system, the controller is further configured to create a second secure transmission path for transmitting the data packets to the second target device. In further related embodiments of the invention, the controller is further configured to re-tag the data packets with a second destination address associated with the second target device.

In additional specific embodiments of the system, the controller is further configured to determine an attempt to wrongfully access or intercept the data packet and, in response to determining the attempt to wrongfully access or intercept the data packets, perform at least one of (i) activate one or more of the logical switches to block further transmission of the data packets, and (ii) re-route the data packets away from an intended one of the target devices to a second one of the target devices.

In other specific embodiments of the system, the controller is further configured to determine that the secure transmission path comprises a physical area that the data packets are precluded from entering and, in response to determining that the secure transmission path comprises a physical location that the data packets are precluded from entering, perform at least one of (i) activate one or more of the logical switches to block further transmission of the data packets, and (ii) re-route the data packets away from the secure transmission path to a second secure transmission path that does not include the physical area.

Moreover, in other specific embodiments of the system, the controller is further configured to activate at least two of the logical switches to isolate data packets. In such embodiments of the invention, the isolated data packets may be subjected to one or more security processes while isolated (i.e., prior to deactivating the at least two of the logical switches). In related specific embodiments of the system, the controller is further configured to activate the at least two of the logical switches to isolate data packets within one of a plurality of security zones within the secure transmission path. In such embodiments of the system, the controller is further configured to sequentially activate at least two of the logical switches to isolate data packets of the identified data packet type within at least two of a plurality of security zones within the secure transmission path. In such embodiments of the invention, the isolated data packets may be subjected to one or more security processes in each of the at least two security zones.

A computer-implemented method for intelligent delivery of data packets within a secure transmission path defines second embodiments of the invention. The method is executed by one or more computing processing device. The method includes tagging data packets with a destination address associated with one or more of the target devices and a data packet type. The method further includes during transmission of the data packets from a source apparatus to the one or more target devices, scanning the data packets to identify the destination address and the data packet type and determining availability of the one or more target devices associated with the identified destination address for processing data of the identified data packet type. The method further includes, in response to determining that the one or more target devices are currently not available for processing data of the identified data packet type, activating one or more logical switches disposed along the secure transmission path to block transmission of data packets of the identified data packet type and, in response to determining that at least one of the one or more target devices are currently available for processing the data, deactivating the one or more of the logical switches to allow transmission of the data packets to the at least one of the one or more target devices.

In specific embodiments of the method, determining availability of the one or more target devices further includes accessing a target device availability database that stores information that indicates time intervals for processing data of a specified data packet type for each of the one or more target devices, and determining availability of one or more target devices based on the time intervals in the target device availability database associated with (i) the one or more target devices associated with the destination address and (ii) the data packet type.

Another computer-implemented method for intelligent delivery of data packets within a secure transmission path defines third embodiments of the invention. The method is executed by one or more computing processing device. The method includes providing a plurality of logical switches within each of a plurality of security zones disposed within the secure transmission path. The method further includes activating at least two of the logical switches within at least one of the security zones to isolate a plurality of data packets within the at least one of the security zones, and conducting one or more security processes on the isolated data packets prior to deactivating the at least two logical switches.

Thus, according to embodiments of the invention, which will be discussed in greater detail below, the present invention provides for intelligent delivery/transmission of data within a secure transmission path of a distributed computing network. The present invention provides for a plurality of logical switches disposed throughout a secure transmission path between a source and target. A controller is configured to control a timing for delivery and/or routing of the data packets to the target apparatus by activating and deactivating the logical switches. In addition, activation of two or more switches provides for isolating data, such that, inline processing (e.g., security checks or the like) can be performed on the data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
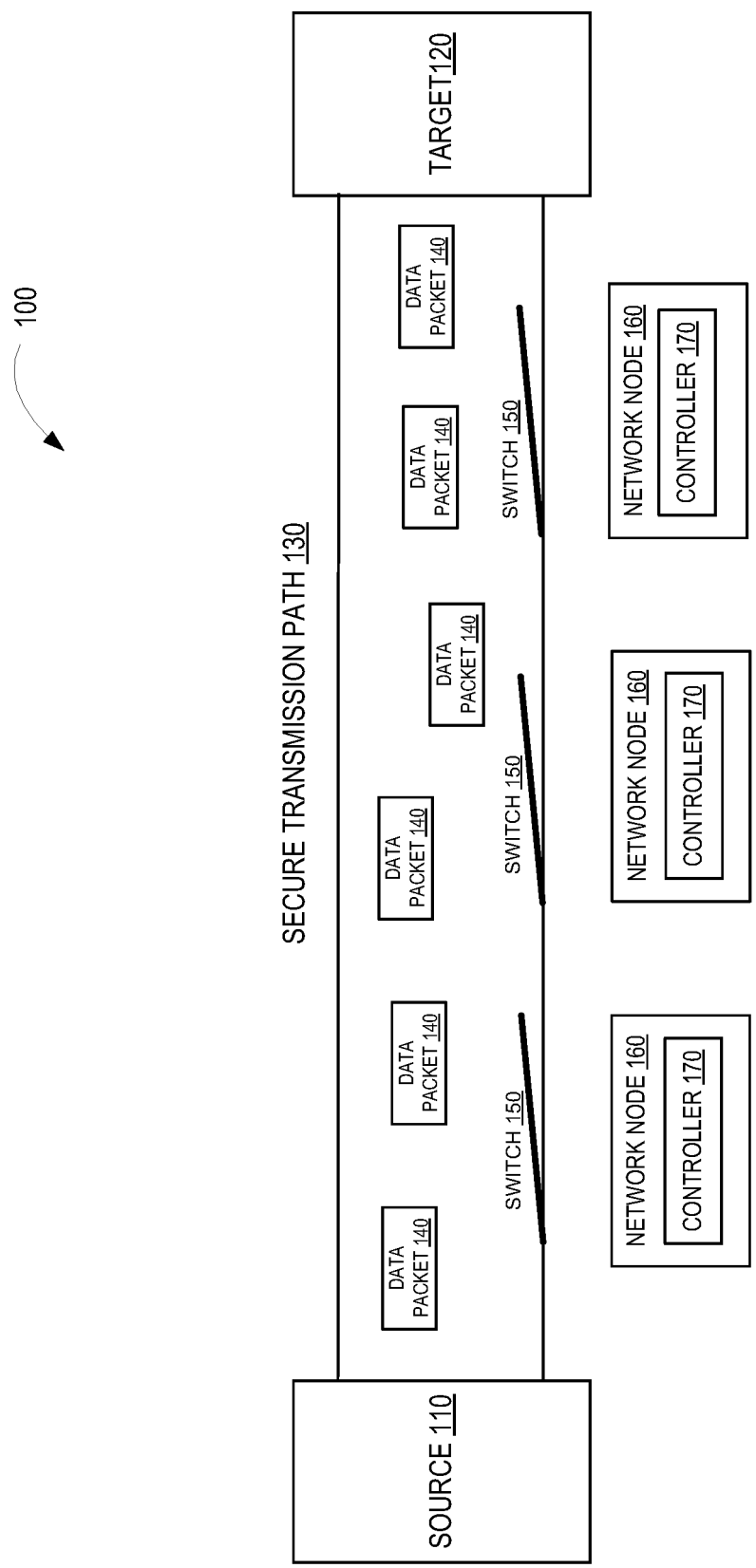
Figure 2:
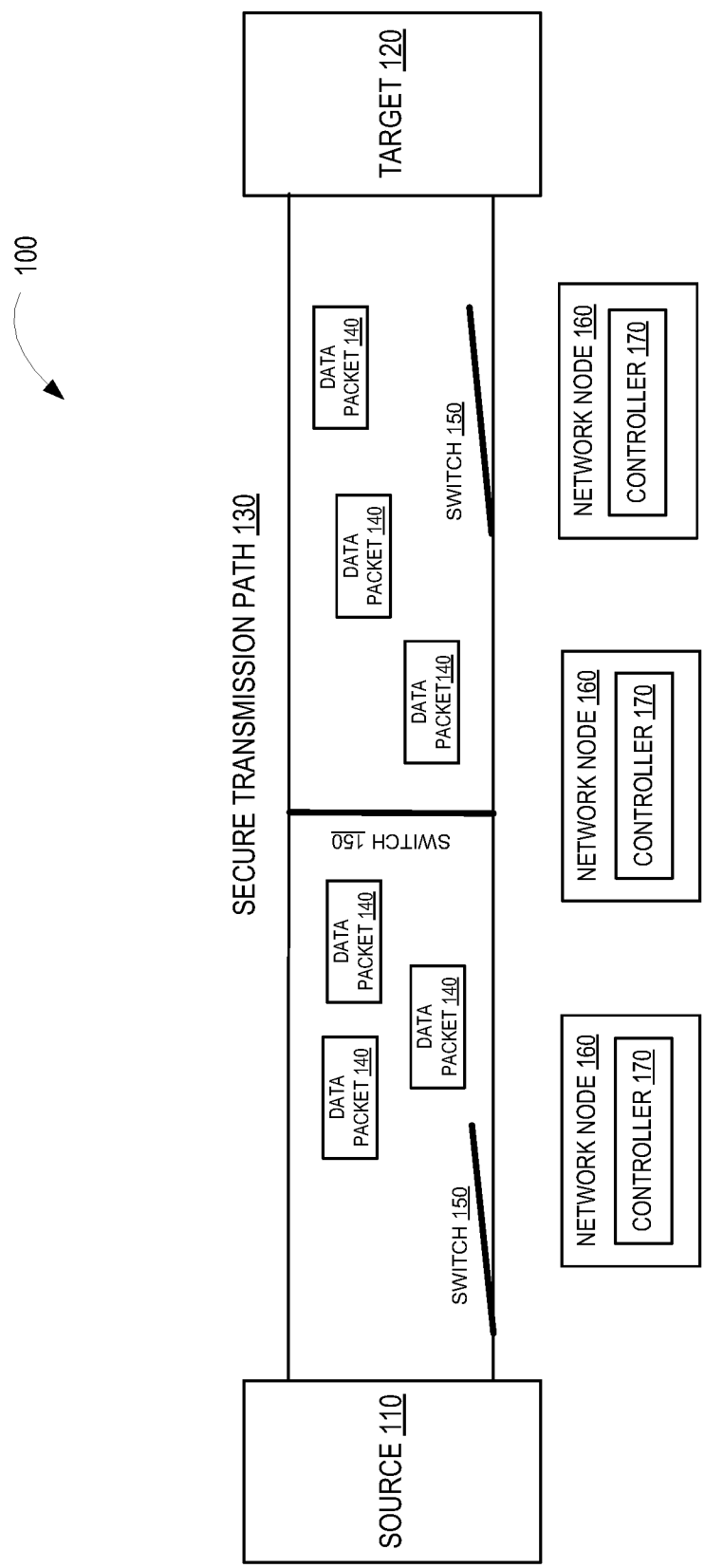
Figure 3:
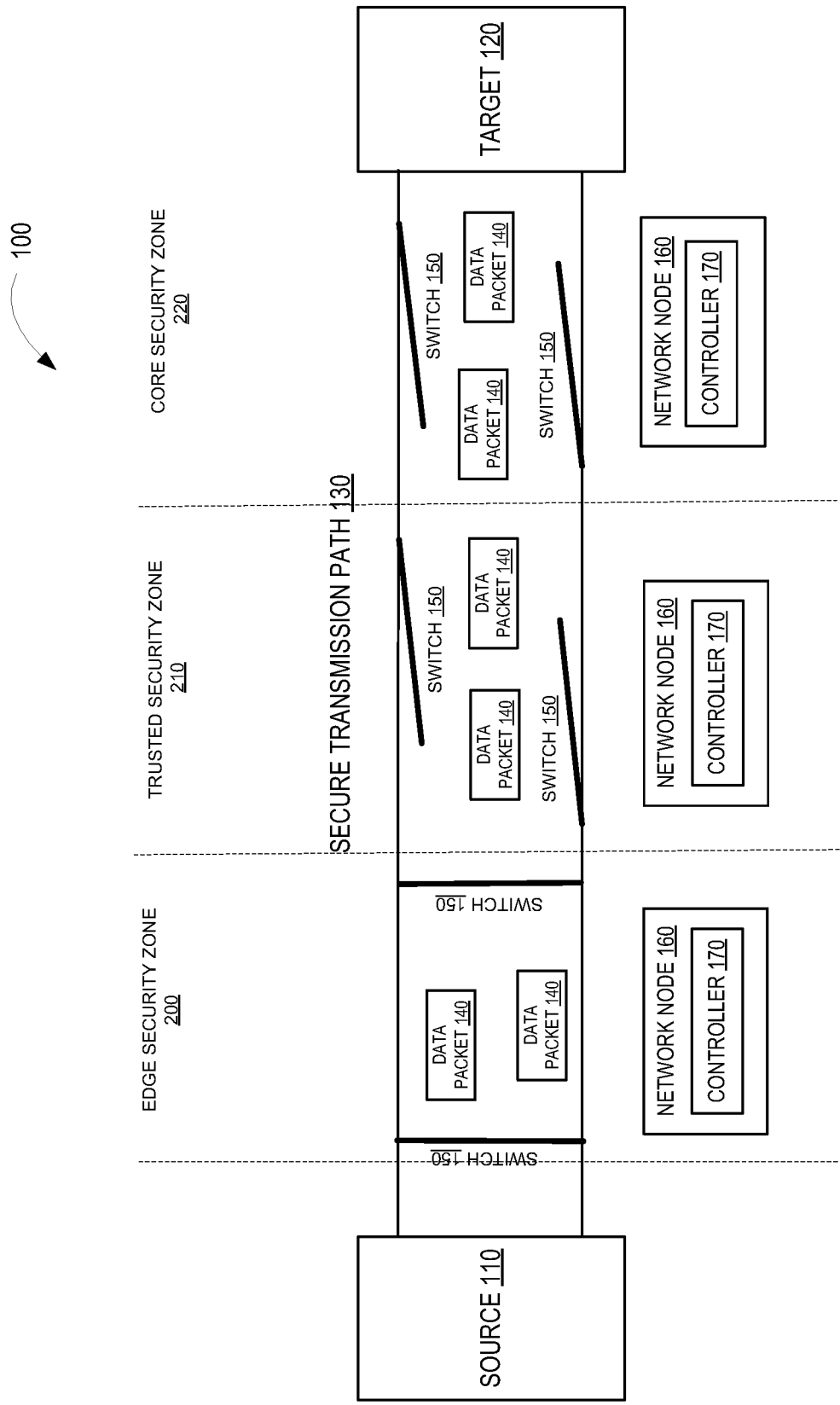
Figure 4:
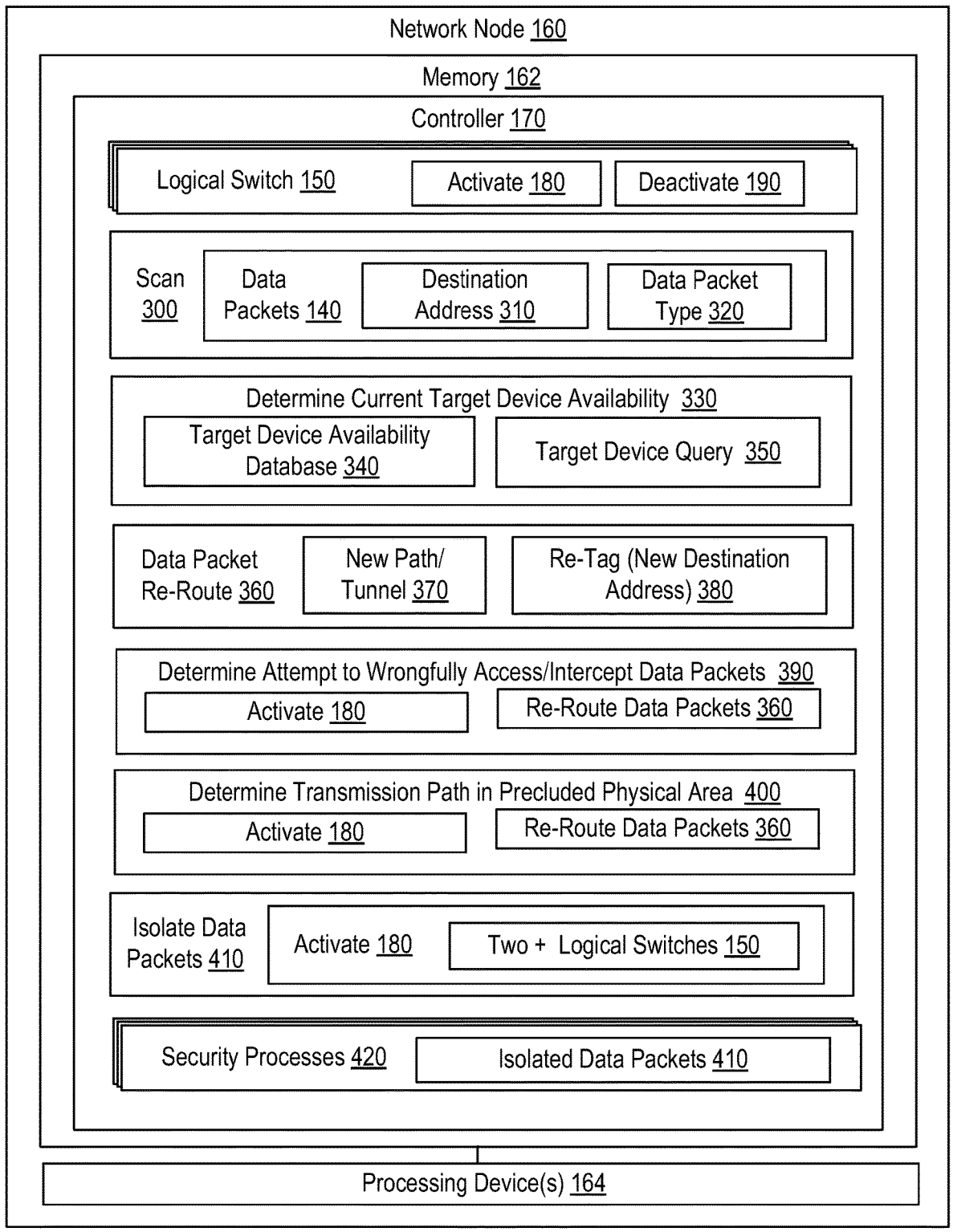
Figure 5:
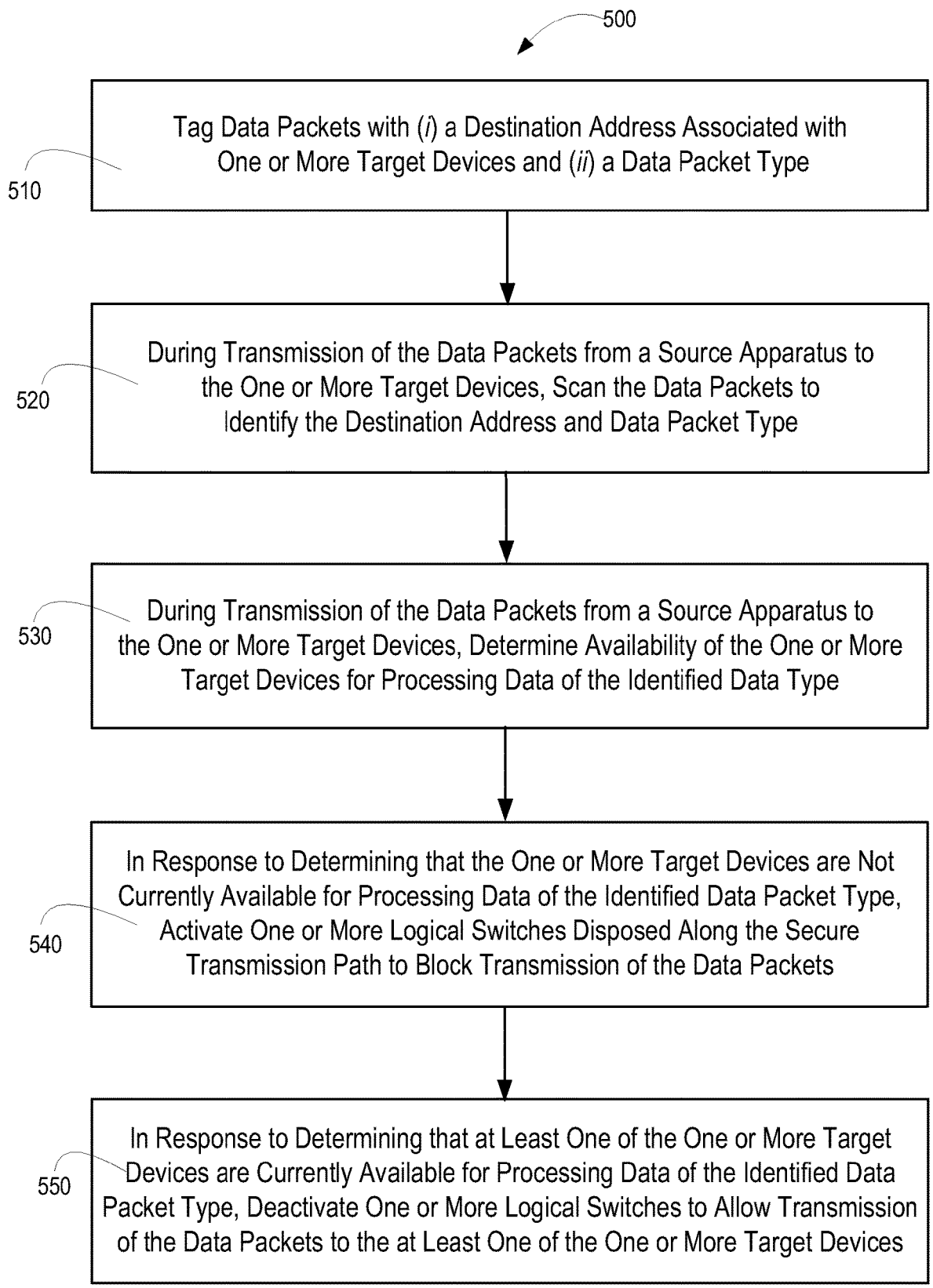
Figure 6:
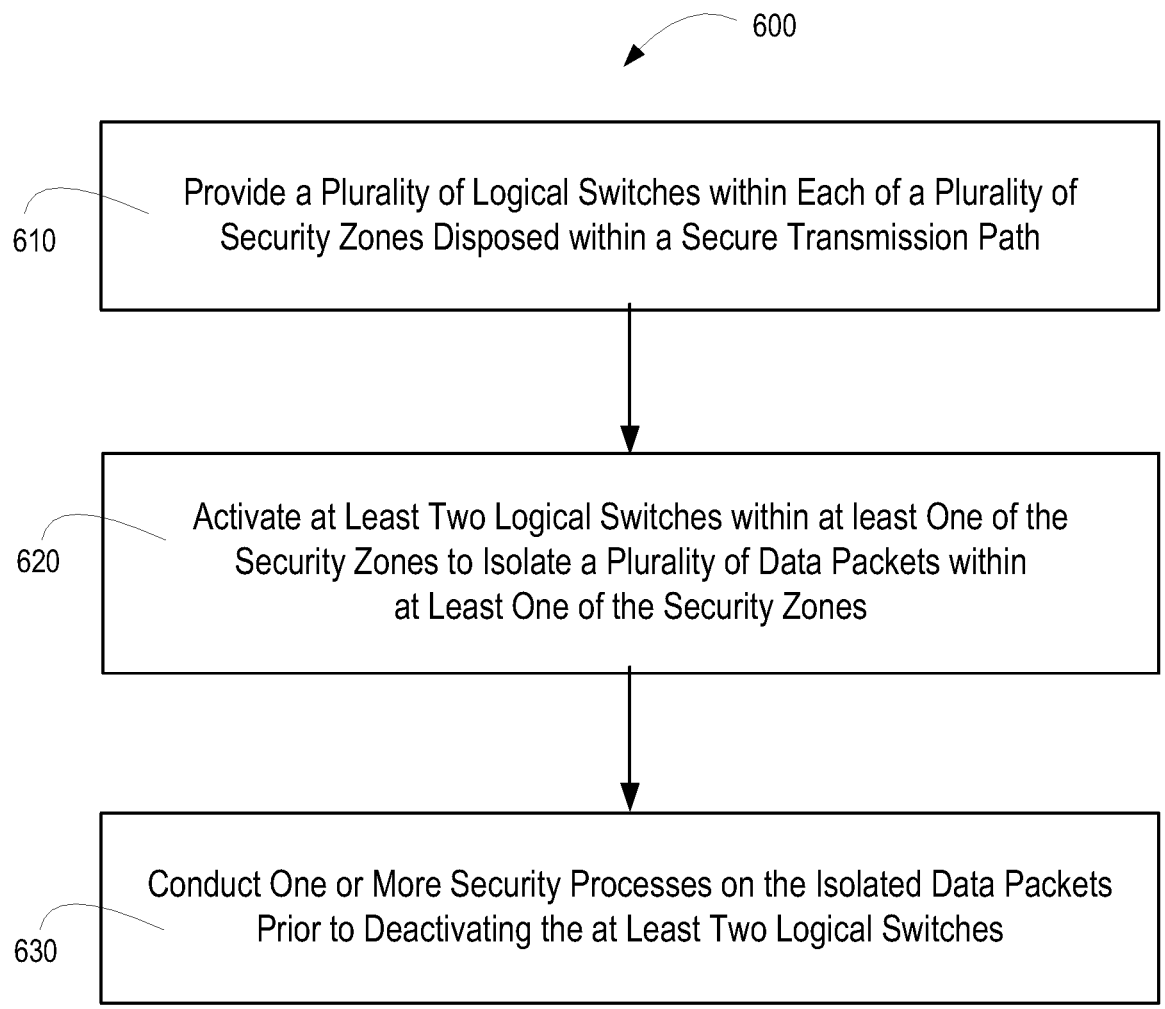

Having thus described embodiments of the disclosure in general terms, reference will now be made to the accompanying drawings, wherein:

FIG. 1 is a schematic diagram of a system for intelligent delivery of data packets within a secure network transmission path, in accordance with some embodiments of the present disclosure;

FIG. 2 is a schematic diagram of a system for intelligent delivery of data packets within a secure network transmission path, in accordance with some embodiments of the present disclosure;

FIG. 3 is a schematic diagram of a system for intelligent delivery of data packets within a secure network transmission path highlighting security zones on the transmission path, in accordance with embodiment of the present invention;

FIG. 4 is a block diagram of controller configured to provide intelligent delivery of data packets within a secure transmission path, in accordance with some embodiments of the present disclosure;

FIG. 5 is a flow diagram of a method for intelligent delivery of data packets within a secure transmission path, in accordance with some embodiments of the present disclosure; and FIG. 6 is a flow diagram of a method for intelligent delivery of data packets within a secure transmission path, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for intelligent delivery/transmission of data sets within a secure transmission path of a distributed computing network. In this regard the present invention provides for a plurality of logical switches disposed throughout a secure transmission path between a source and target. A controller is configured to control a timing for delivery and/or routing of the data packets to the target apparatus by activating and deactivating the logical switches.

In specific embodiments of the invention, the current availability of the target device(s) to process data of a specified data types is determined on a per-target basis. Availability may be determined by accessing a target device schedule database or making a real-time call out to the target device(s). In response to determining that a target device(s) is currently not available for processing data of the specified data type, logical switch(es) may be activated to block transmission of the data and, in some embodiments of the invention, in response to determining that the target device(s) are currently available for processing the data, deactivate the logical switch(es) to allow transmission of the data to the target device(s). In other specific instances, in response to determining that the target device is unavailable for processing the data, the data is reroute away from an intended target device currently determined to be unavailable to a another target device currently determined to be available for processing the data. In such instances, a second secure transmission path may be created for transmitting the data packets to the second target device and/or the data packets may be re-tagged with a second destination address associated with the other target device.

In other embodiments of the invention, in response to determining an attempt to wrongfully access or intercept the data, the logical switch(es) are activated to block further transmission of the data packets, and/or (ii) the data is re-routed away from an intended target device(s) to a another target device(s).

In other embodiments of the invention, two or more switches in the transmission path are activated to isolate the data. The isolated data may then be subjected to security processes (antivirus checks) or the like. In specific embodiments of the invention, the activation of two or more switches to isolate the data may occur in one specific security zone or in each security zone, such that individual security processes may be performed within in security zone as the data is isolated.

Turning now to the figures, FIG. 1 a schematic diagram is of a system 100 for providing intelligent delivery of data packets with a secure transmission path, in accordance with embodiments of the present invention. The system includes a source 110 which is configured to transmit a data set comprising a plurality of data packets 140. The source 110 may comprise one or more computing devices, such as one or more servers or the like. The system additionally includes a target 120 configured to receive and, in some embodiments, process the data set. The target 120 may include one or more (i.e., a cluster) of computing devices, source as one or more servers or the like. A secure transmission path 130 is configured from the source 110 to the target 120. In specific embodiments of the system 100, the secure transmission path 130 may include tunneling or port forwarding, which allows private network data transmissions to be sent across a public network, such as the Internet, through an encapsulation process. The encapsulation process allows for the data packets to appear as though they are of a public nature to a public network when, in fact, they are private data packets. Common protocols used to facilitate tunneling data transmission include, but are not limited to, IP in IP (Protocol 4), SIT/IPv6 (Protocol 41), Generic Routing Encapsulation (GRE) (Protocol 47), Secure Socket Tunneling Protocol (SSTP) (TCP port 443), Internet Protocol Security (IPSec) (protocol 50 and 51), Layer 2 Tunneling Protocol (L2TP) (Protocol 115), Virtual Extensible Local Area Network (VXLAN) (UDP port 4789) and the like. The secured transmission path may be one-time only connection/path or the secured transmission path may be ongoing/continuous connection/path.

The secure transmission path 130 includes a plurality of logical switches 150 that are activated and deactivated by one of a plurality of controllers 170 disposed within a network node 160 (i.e., a hop in the secure transmission path 130 of a distributed communications network (not shown in FIG. 1)). Specifically, the controller is configured to control, at least one of, (i) timing for delivery of the data packets 140 to the target 120 and (ii) routing of the data packets to specific one(s) of the target devices, by activating and deactivating the logical switches 150. In FIG. 1, the logical switches are shown as being deactivated and, as such, the data packets 140 are free to flow from the source 110 to the target 120.

Referring to FIG. 2, a system 100 is depicted for intelligent delivery of data packets within a secure transmission path 130, in accordance with embodiments of the present invention. As shown, in the system 100 of FIG. 2 one of the logical switches 150 within the secure transmission path 130 has been activated to block or otherwise inhibit transmission of the data packets to the target 120. In specific embodiments of the system 100, the activation of the logical switch 150 may be due to the current unavailability of the target 120. For example, the target 120 device(s) may currently be processing data of another data type or may otherwise be down (e.g., scheduled/unscheduled maintenance or the like).

In specific embodiments of the system 100, the data packets 140 are tagged, at the source 110, with a destination address (i.e., an address associated with the target 120 and/or one or more devices within the target 120) and a data packet type, which identifies the type of processing which the data packets will undergo at the target 120. During transmission of the data packets, the controller 170 or some other network processor scans the data packets 140 to identify the destination address and the data packet type and the controller 170 or some other network processor determines current availability of the target device(s) associated with the identified destination address to process the data packets of the identified data packet type. In specific embodiments of the system, availability may be determined by accessing a target device availability database that is configured to store information that indicates time intervals/schedules for processing data of specified data packet type for each target device (or the target devices that comprise target 120). In other embodiments of the system, availability may be determined by pinging or otherwise communicating with the target device(s) to receive information from the target device(s) associated with the destination address that indicates a current availability of the target device(s) to process data of the identified data packet type.

In response to the controller 170 or other network processor/device determining that one or more of the target device(s) are currently not available for processing data of the identified data packet type, one or more of the logical switches 150 are activated to block transmission of the data packets to the target device(s) currently not available and, in some embodiments, re-routing the data packets away from the unavailable target device(s) to other target devices that currently are available to process the data packets. In such embodiments of the invention, the controller 170 or some other network processing device may be configured to create a second secure transmission path/tunnel for transmitting the data packets to the available target device(s) and/or re-tag the data packets with a second destination address corresponding to the available target device(s).

Referring to FIG. 3, a system 100 is depicted for intelligent delivery of data packets within a secure transmission path 130 highlighting security zones in the secure transmission path and the isolation of the data packets within security zones, in accordance with embodiments of the present invention. In specific embodiments of the system 100, the secure transmission path 130 may include a plurality of security zones, such as edge security zone 200, trusted security zone 210 and core security zone 220. In general, as depicted, the level of security may increase from left to right, such that the edge security zone 200 presents the lowest level of security, the trusted security zone 210 presents an intermediary level of security and the core security zone 220, which may reside inside the trusted security zone 210 and/at the target location presents the highest level of security.

In specific embodiments of the invention, two or more of the logical switches 150 may be activated to isolate the data packets 140 within a particular security zone. In the illustrated example of FIG. 3, two logical switches 150 have been activated within the edge security zone 200 to isolate the data packets 140 located within the edge security zone 200. Isolation of the data packets 140 means that the data packets 140 are blocked from further transmission and that the set of data packets 140 contained by the two logical switches 150 are compartmentalized and finite. In specific embodiments of the system 100, the data packets 140 that are isolated by the activation of the two logical switches 150 are subjected to one or more security processes/checks (e.g., antivirus screening or the like) prior to deactivating the two logical switches 150 and allowing the data packets 140 to be further transmitted along the secure transmission path. In other specific embodiments of the invention, the controller 170 in the edge security zone 200 may notify a downstream controller 170 (e.g., the controller 170 in the trusted security zone 210) of an impending need to activate two or more logical switches 150 in the next security zone after the data packets have been released from the edge security zone 200 (i.e., after the two logical switches 150 in the edge security zone 200 have been deactivated). Sequential activation of the logical switches 150 within two or more and, in some embodiments, all of the security zones, provides for the data packets 140 to be isolated in each of the two or more, and in some, embodiments, all of the security zones and for one or more security processes/checks to occur in each of the security zones where the logical switches 150 are activated (i.e., the security zones where data packet isolation occurs).

Referring to FIG. 4 a block diagram is depicted of the network node 160 having an associated controller 170 for controlling logical switches 150 disposed throughout a secure transmission path/tunnel, in accordance with embodiments of the present invention. Network node 160, which comprises one or more computing devices (e.g., servers or the like), is configured to execute instructions, such as algorithms, modules, routines, applications and the like. Network node 160 includes memory 162, which may comprise volatile and non-volatile memory, such as read-only and/or random-access memory (RAM and ROM), EPROM, EEPROM, flash cards, or any memory common to computing platforms). Moreover, memory 162 may comprise cloud storage, such as provided by a cloud storage service and/or a cloud connection service.

Further, network node 160 also includes at least one processing device 164, which may be an application-specific integrated circuit ("ASIC"), or other chipset, logic circuit, or other data processing device. Processing device(s) 164 may execute one or more application programming interface (APIs) (not shown in FIG. 4) that interface with any resident programs, such as controller 170 or the like, stored in the memory 162 of the network node 160 and any external programs. Processing devices(s) 164 may include various processing subsystems (not shown in FIG. 4) embodied in hardware, firmware, software, and combinations thereof, that enable the functionality of network node 160 and the operability of the network node 160 on the distributed computing network. For example, processing subsystems allow for initiating and maintaining communications and exchanging data with other networked devices. For the disclosed aspects, processing subsystems of processing device 162 may include any subsystem used in conjunction with controller 170 and related tools, routines, sub-routines, algorithms, sub-algorithms, sub-modules thereof.

Network node 160 may additionally include a communications module (not shown in FIG. 4) embodied in hardware, firmware, software, and combinations thereof, that enables electronic communications between the network node 160 and other network devices, and logical switches 150. Thus, communication module may include the requisite hardware, firmware, software and/or combinations thereof for establishing and maintaining a network communication connection with one or more network devices.

Memory 162 of network node 160 stores controller 170 that is configured to control the plurality of logical switches 150 disposed within the secure transmission path. In this regard, controller 170 is configured to activate 180 and deactivate 190 the logical switches 190 to control the timing for delivery of data packets 140 to a target and/or routing of the data packets 140 to a target device currently available for processing the data packets 150.

In specific embodiments of the invention, controller 170 is configured to scan 300 or otherwise read the header of the data packets 140 to identify a destination address 310 and data packet type 320. The destination address 310 is associated with one or more (i.e., a cluster) target devices and the data packet type 320 determines the type of processing that the data packet will undergo at the target. In response to identifying the destination address 310 and the data packet type 310, the controller 170 is configured to determine current target device availability 330. In specific embodiments of the invention, the current target device availability is determined by accessing a target device availability database 340 that indicates schedules/time intervals at which specified target devices process specified data types. Thus, the information in the target device availability database 340 is compared to the destination address 310 in the data packets 150, which serves to identify the target devices and the data packet type 320, which serves to identify data types. In other embodiments of the invention, the target device(s) associated with the destination address 310 are queried 350 to determine current availability of the target device(s) to process data of the packet data type 320.

In further specific embodiments of the invention, the controller 170 is configured to re-route 360 data packets. For example, if the controller 170 determines that none of the target devices associated with the destination 310 are currently available to process data of the identified data packet type 320, the controller 170 may be configured to re-route 360 the data packets 150. Re-routing may include generating a new secure transmission path/tunnel 370 and/or re-tagging 380 the data packets 140 with a new destination address or the like.

In further specific embodiments of the invention, the controller 170 or some other processing device associated with network node 160 is configured to determine or otherwise acknowledge an attempt to wrongfully access/intercept 390 the data packets 140 and, in response, activate 180 one or more logical switches 150 and/or re-route data packets 360 to a new destination address.

In further specific embodiments of the invention, controller 170 or some other processing device associated with network node 160 is configure to determine or otherwise detect that at least a portion of the transmission path is in a prohibited physical area 400 (e.g., data packets are prohibited from entering a predetermined country or the like) and, in response, activate 180 one or more logical switches 150 and/or re-route data packets 360 to a new transmission path that does not include the prohibited physical area.

In addition, as previous discussed, controller 170 may be configured to isolate 410 data packets 140 be activating 180 in sequence two successive logical switches 140. Activating 180 two or more switches 150 allows for the isolated data packets to undergo one or more security processes 420 while isolated. Isolation allows for the data packets to be contained between two logical switches 150 such that a finite quantity of data packets are held within an isolation area. The security processed may include, but are not limited to, antivirus scans/checks, data packet integrity checks and the like.

Referring to FIG. 5 a flow diagram is presented of a method 500 for intelligent delivery of data packets within a secure transmission path, in accordance with embodiments of the present invention. At Event 510, during data packet generation at the source, data packets are tagged with a destination address associated one or more target devices and a data packet type, which defines the type of processing that the data packets will undergo at the target.

At Event 520, during transmission of the data packets from a source to a target within a secure transmission path, e.g., tunnel transmission path or the like, the data packets are scanned to identify the destination address and the data packet type. At Event 530, also during transmission of the data packets, the current availability of the target devices associated with the destination address to process data of the data packet type is determined. In specific embodiments of the method, the current availability of the target devices is determined by accessing a target availability database that stores information/schedules related to time intervals in which the specific data types undergo processing at specific target devices. In other embodiments the target devices are queried to determine what data type the device is currently processing or intends to process in the near-future.

At Event 540, in response to determining that one or more target devices associated with the destination address are not currently available for processing data of the identified data packet type, one or more logical switches along the secure transmission path are activated to block transmission of the data packets.

At Event 550, in response to determining that at least one of the one or more target devices are currently available to process data of the identified data packet type, the one or more previously activated logical switches are deactivated to allow transmission of the data packets to the at least one of the one or more data packets. The deactivation of the logical switches may coincide with re-routing (i.e., opening a new secured transmission path/tunnel) the data packets to the at least one of the one or more target devices, which may include re-tagging the data packets with a new destination address.

Referring to FIG. 6 a flow diagram is presented of a method 600 for intelligent delivery of data packets within a secured transmission path, in accordance with embodiments of the present invention. At Event 610, at least two logical switches are provided with each of a plurality of security zones within a secured transmission path/tunnel. As previously discussed the security zones may include, but are not limited to, an edge security zone, a trusted security zone, a core security zone and the like.

At Event 620, at least two logical switches are activated within at least one of the security zones to isolate a plurality of data packets currently residing within the at least one of the security zones. The switches may be activated in response to determining that (i) target devices are not currently available to process the data, (ii) an attempt has been made to access (i.e., read, intercept, capture or the like) the data packets, and/or (iii) the data packets will or have entered a physical location that forbids transmission of data of a specified data type or the like.

At Event 630, one or more security processes (e.g., antivirus checks or the like) are performed on the isolate data packets prior to deactivating the at least two logical switches. The data packets may be isolated and one or security processes performed in each of the security zones or at least two security zones. The security zones in which the data packets are isolated and security processing performed may be sequential in order or, in other embodiments of the method, the security zones may be non-sequential in order. In such embodiments of the method, downstream controllers may be notified, in advance, of the need to isolate the data packets (i.e., activate two or more corresponding logical switches) by controllers currently responsible for activating/deactivating logical switches. In response to conducting the security processes, the at least two logical switches are deactivated and, in some embodiments of the method, the data packets are transmitted to their original destination address, while in other embodiments of the method, the data packets are re-routed to a new destination address. In those embodiments in which the data packets are re-routed to a new destination address, a new secure transmission path/tunnel may be formed and the data packets may be re-tagged with the new destination address.

Thus, present embodiments of the invention provides for intelligent delivery/transmission of data within a secure transmission path/tunnel of a distributed computing network. A plurality of logical switches are disposed throughout a secure transmission path between a source and target. A controller is configured to control a timing for delivery and/or routing of the data packets to the target apparatus by activating and deactivating the logical switches. In addition, activation of two or more switches provides for isolating data, such that, inline processing (e.g., security checks or the like) can be performed on the data.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent delivery of data packets within a secure transmission path, the system comprising:
   a distributed computing network including:
   at least one source apparatus in communication with the distributed computing network and configured for transmitting a data set comprising a plurality of data packets,
   at least one target apparatus comprising one or more target devices, wherein the target apparatus in communication with the distributed computing network and configured for receiving the data set via a secure transmission path established between the source apparatus and the target apparatus, and
   a plurality of network nodes disposed along the secure transmission path;
   a plurality of logical switches stored in a memory associated with at least one of the network nodes, executable by one or more processing devices associated with at least one of the network nodes; and
   a controller stored in the memory associated with at least one of the network nodes, executable by one or more of the processing devices and configured to:
   control at least one of (i) timing for delivery of the data packets to the target apparatus, and (ii) routing of the data packets by activating and deactivating the logical switches,
   determine an attempt to wrongfully access or intercept the data packets during transmission of the data set via the secure transmission path and, in response to determining the attempt to wrongfully access or intercept the data packets, (i) activate one or more of the logical switches to block further transmission of the data packets to one or more target devices of the target apparatus, and (ii) re-route the data packets to an alternate target apparatus by creating a second secure transmission path for transmitting the data packets to the alternate target apparatus and re-tagging the data packets with a second destination address associated with the alternate target apparatus.

2. The system of claim 1, wherein the data packets are tagged with a destination address associated with one or more of the target devices and a data packet type.

3. The system of claim 2, wherein the controller is further configured to:
   scan the data packets along the secure transmission path to identify the destination address and the data packet type, and
   determine availability of the one or more target devices associated with the identified destination address for processing data of the identified data packet type.

4. The system of claim 3, wherein the controller is further configured to:
   in response to determining that the one or more target devices are currently not available for processing data of the identified data packet type, activate one or more of the logical switches to block transmission of data packets of the identified data packet type, and
   in response to determining that at least one of the one or more target devices are currently available for processing the data, deactivate the one or more of the logical switches to allow transmission of the data packets to the at least one of the one or more target devices.

5. The system of claim 4, further comprising:
   a target device availability database configured to store information that indicates time intervals for processing data of a specified data packet type for each of the one or more target devices.

6. The system of claim 5, wherein the controller is further configured to access the target device availability database to determine availability of one or more target devices based on the time intervals in the target device availability database associated with (i) the one or more target devices associated with the destination address and (ii) the data packet type.

7. The system of claim 3, wherein the controller is further configured to, in response to identifying the destination address and data packet type, receive information from the one or more target devices associated with the identified destination address that indicates a current availability of the one or more target devices to process data of the data packet type.

8. The system of claim 3, wherein the controller is further configured to, in response to determining availability of the one or more target devices associated with the identified destination address for processing data of the identified data packet type, reroute the data packets away from a first target device currently determined to be not available to a second target device currently determined to be available.

9. The system of claim 8, wherein the controller is further configured to create a second secure transmission path for transmitting the data packets to the second target device.

10. The system of claim 8, wherein the controller is further configured to re-tag the data packets with a second destination address associated with the second target device.

11. The system of claim 1, wherein the controller is further configured to determine that the secure transmission path comprises a physical area that the data packets are precluded from entering and, in response to determining that the secure transmission path comprises a physical location that the data packets are precluded from entering, perform at least one of (i) activate one or more of the logical switches to block further transmission of the data packets, and (ii) re-route the data packets away from the secure transmission path to a second secure transmission path that does not include the physical area.

12. The system of claim 1, wherein the controller is further configured to activate at least two of the logical switches to isolate data packets.

13. The system of claim 12, wherein the isolated data packets are subjected to one or more security processes prior to deactivating the at least two of the logical switches.

14. The system of claim 12, wherein the controller is further configured to activate the at least two of the logical switches to isolate data packets within one of a plurality of security zones within the secure transmission path.

15. The system of claim 14, wherein the controller is further configured to sequentially activate at least two of the logical switches to isolate data packets of the identified data packet type within at least two of a plurality of security zones within the secure transmission path.

16. The system of claim 15, wherein the isolated data packets are subjected to one or more security processes in each of the at least two security zones.

17. A computer-implemented method for intelligent delivery of data packets within a secure transmission path, the method executed by one or more computing processing device and comprising:
- tagging data packets with a destination address associated with one or more of the target devices and a data packet type;
- during transmission of the data packets from a source apparatus to the one or more target devices:
  - scanning the data packets to identify the destination address and the data packet type;
  - determining availability of the one or more target devices associated with the identified destination address for processing data of the identified data packet type;
  - in response to determining that the one or more target devices are currently not available for processing data of the identified data packet type, activating one or more logical switches disposed along the secure transmission path to block transmission of data packets of the identified data packet type;
  - in response to determining that at least one of the one or more target devices are currently available for processing the data, deactivating the one or more of the logical switches to allow transmission of the data packets to the at least one of the one or more target devices;
  - determining an attempt to wrongfully access or intercept the data packets; and
  - in response to determining the attempt to wrongfully access or intercept the data packets, (i) activating one or more of the logical switches to block further transmission of the data packets to one or more target devices of the target apparatus, and (ii) re-routing the data packets to an alternate target apparatus by creating a second secure transmission path for transmitting the data packets to the alternate target apparatus and re-tagging the data packets with a second destination address associated with the alternate target apparatus.

18. The computer-implemented method of claim 17, wherein determining availability of the one or more target devices further comprises:
- accessing a target device availability database that stores information that indicates time intervals for processing data of a specified data packet type for each of the one or more target devices; and
- determining availability of one or more target devices based on the time intervals in the target device availability database associated with (i) the one or more target devices associated with the destination address and (ii) the data packet type.

19. A computer-implemented method for intelligent delivery of data packets within a secure transmission path, the method executed by one or more computing processing device and comprising:
- providing a plurality of logical switches within each of a plurality of security zones disposed within the secure transmission path;
- determining an attempt to wrongfully access or intercept the data packets during transmission if the data packets via the secure transmission path;
- in response to determining the attempt to wrongfully access or intercept the data packets, activating at least two of the logical switches within at least one of the security zones to isolate a plurality of data packets within the at least one of the security zones and block further transmission of the data packets to one or more target devices;
- conducting one or more security processes on the isolated data packets prior to re-routing the data packets to one or more alternate target devices; and
- re-routing the data packets to one or more alternate target devices by creating a second secure transmission path for transmitting the data packets to the alternate target apparatus and re-tagging the data packets with a second destination address associated with the alternate target apparatus.

* * * * *